United States Patent
Watanabe et al.

(10) Patent No.: US 9,712,021 B2
(45) Date of Patent: Jul. 18, 2017

(54) COOLING SYSTEM FOR MOTOR

(71) Applicants: Masato Watanabe, Toyota (JP);
Takeshi Kanayama, Toyota (JP);
Yosuke Kato, Gotemba (JP); Nobuhito Mori, Shizuoka-ken (JP); Shinichiro Suenaga, Susono (JP); Takamasa Takeuchi, Anjo (JP); Norihiro Mae, Anjo (JP); Tomoo Atarashi, Kariya (JP); Yasuo Shimizu, Nagoya (JP)

(72) Inventors: Masato Watanabe, Toyota (JP);
Takeshi Kanayama, Toyota (JP);
Yosuke Kato, Gotemba (JP); Nobuhito Mori, Shizuoka-ken (JP); Shinichiro Suenaga, Susono (JP); Takamasa Takeuchi, Anjo (JP); Norihiro Mae, Anjo (JP); Tomoo Atarashi, Kariya (JP); Yasuo Shimizu, Nagoya (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 256 days.

(21) Appl. No.: 14/026,449

(22) Filed: Sep. 13, 2013

(65) Prior Publication Data
US 2014/0077631 A1    Mar. 20, 2014

(30) Foreign Application Priority Data
Sep. 18, 2012   (JP) .................. 2012-204419

(51) Int. Cl.
*H02K 9/19*      (2006.01)
*H02K 9/193*     (2006.01)
*H02K 3/04*      (2006.01)

(52) U.S. Cl.
CPC ............... *H02K 9/19* (2013.01); *H02K 3/04* (2013.01); *H02K 9/193* (2013.01)

(58) Field of Classification Search
CPC ............ H02K 9/19; H02K 9/193; H02K 9/00
(Continued)

(56) References Cited

U.S. PATENT DOCUMENTS 5,889,342 A * 3/1999 Hasebe ................ H02K 1/32
                                          310/60 A
6,707,180 B2 * 3/2004 Hattori ................. H02K 1/32
                                          310/52

(Continued)

FOREIGN PATENT DOCUMENTS

JP     09-182374 A       7/1997
JP     2006067777 A  *   3/2006
(Continued)

OTHER PUBLICATIONS

JP2006067777 (Ogawa et al.) Mar. 9, 2006 (description). [online] [retrieved on Jul. 16, 2015] Retrived from Espacenet machine translation, paragraph [0022], FIG 1-3.*

*Primary Examiner* — John K Kim
*Assistant Examiner* — Minki Chang
(74) *Attorney, Agent, or Firm* — Andrews Kurth Kenyon LLP

(57) ABSTRACT

In a vertical through hole of a rotational shaft, a first protrusion portion and a second protrusion portion protruding from an inner peripheral surface of the vertical through hole are provided in an axial direction of the through hole to form a storage area for storing oil, and discharge holes for directly discharging oil flowing over the first protrusion portion into the transaxle casing are provided in parallel with cooling holes.

7 Claims, 6 Drawing Sheets

(58) Field of Classification Search
USPC .................. 310/52, 53, 54, 61, 400, 200
See application file for complete search history.

(56) References Cited

U.S. PATENT DOCUMENTS

| | | | | |
|---|---|---|---|---|
| 8,896,167 | B2* | 11/2014 | McKinzie et al. .............. | 310/61 |
| 2004/0207204 | A1* | 10/2004 | Shiga ....................... | H02K 9/06 |
| | | | | 290/38 R |
| 2010/0045125 | A1* | 2/2010 | Takenaka ................. | H02K 1/20 |
| | | | | 310/54 |
| 2012/0091833 | A1* | 4/2012 | Hackett ................... | H02K 9/19 |
| | | | | 310/53 |
| 2012/0299404 | A1* | 11/2012 | Yamamoto ........... | H02K 1/2766 |
| | | | | 310/61 |
| 2013/0221772 | A1* | 8/2013 | Miyamoto ............... | H02K 9/19 |
| | | | | 310/54 |
| 2013/0257196 | A1* | 10/2013 | Yamamoto ............... | H02K 9/19 |
| | | | | 310/54 |

FOREIGN PATENT DOCUMENTS

| | | | |
|---|---|---|---|
| JP | 2011-083139 A | | 4/2011 |
| JP | 2011083139 A | * | 4/2011 |
| WO | 2011/118062 A1 | | 9/2011 |

\* cited by examiner

COOLING SYSTEM FOR MOTOR

INCORPORATION BY REFERENCE

The disclosure of Japanese Patent Application No. 2012-204419 filed on Sep. 18, 2012 including the specification, drawings and abstract is incorporated herein by reference in its entirety.

BACKGROUND OF THE INVENTION

1. Field of the Invention

The present invention relates to a cooling system for a motor, particularly to a technology of cooling a rotor of the motor.

2. Description of the Related Art

In a cooling system for a motor in a related art, since the temperature of a coil of a stator of the motor is closer to a heat-resistant limit than the temperature of magnets installed in a rotor of a motor, a cooling method for cooling the stator has been adopted. In the cooling method centering on the stator, oil is poured to an outer periphery of the stator to lower the temperature of the stator and the temperatures of the rotor and the stator of the motor are thereby controlled to a specified temperature or lower, for example.

However, in recent years, there are cases where the temperature of the rotor of the motor becomes closer to the heat-resistant limit than the temperature of the stator. To prevent the increase in the cost for rare earth element and export restrictions on rare earth elements, development for preventing the cost increase and for reducing production risk has been in progress. The development for preventing the cost increase and the production risk is to reduce the content of rare earth elements contained in the magnets used in the rotor of the motor, for example. However, the content of rare earth elements is reduced so that the magnets in the rotor of the motor is portions with the lowest heat resistance. Accordingly, it is now necessary to consider a method for directly cooling the rotor of the motor. In such a circumstance, for example, Japanese Patent Application No. 2011-83139 and Japanese Patent Application Publication No. 09-182374 (JP 09-182374 A) disclose cooling systems for a motor that include a cylindrical stator, a rotor, and a rotational shaft. In the cooling system oil supplied into a through hole formed along an axis in the rotational shaft to flow out through a cooling oil hole which passes through a peripheral wall of the rotational shaft to cool the rotor. The stator is fixed in a container-shaped casing. The rotor is positioned to have a prescribed gap from the stator in the stator. The rotational shaft is in a cylindrical shape which rotatably supports the rotor. In the above-described cooling system, as Japanese Patent Application No. 2011-83139 discloses, the oil supplied to the vertical through hole of the rotational shaft is also used as lubricating oil which is supplied to bearings rotatably supporting the rotational shaft, for example. In other words, in the above-described cooling system for a motor, the cooling oil passage for cooling the rotor communicates with the lubricating oil passage for lubricating the bearing.

In the above-described cooling system for a motor, an oil supply passage is designed so that the oil amount supplied to the rotor becomes optimal. However, for example, the oil supply ability varies depending on the rotation speed of the oil pump which supplies oil to the through hole of the rotational shaft, and the ability of discharging oil by the centrifugal force varies depending on the rotation speed of the rotor of the motor. Therefore, there may be a case where the oil supplied from the oil pump is not effectively used for cooling the rotor. Accordingly, excess oil which cannot be consumed for cooling the rotor is supplied to rotational bodies such as bearings and gears via the lubricating oil passage. This results in energy consumption for stirring the excess oil and in possible low rotation efficiency of the motor.

SUMMARY OF THE INVENTION

The present invention provides a cooling system for a motor which prevents the lowering of rotation efficiency of the motor due to excess oil which is not used for cooling a rotor of the motor.

A first aspect of the present invention provides a cooling system for a motor, which includes: a cylindrical stator fixed in a casing; a rotor arranged to have a prescribed gap from the stator inside the stator; and a cylindrical rotational shaft for supporting the rotor, and cools the rotor by allowing oil supplied to a vertical through hole of the rotational shaft to flow out through a cooling hole provided in the rotational shaft, in which in the vertical through hole, a pair of protrusion portions that protrude from an inner peripheral surface of the vertical through hole in an axial direction of the vertical through hole are provided to form a storage area which includes the cooling hole and stores the oil, and in the rotational shaft, a discharge hole for discharging the oil in the vertical through hole into the casing is provided on a side farther than the protrusion portion from a center of the motor and in parallel with the cooling hole in the axial direction.

A second aspect of the present invention provides a cooling system for a motor, which includes: a cylindrical stator fixed in a casing; a rotor arranged to have a prescribed gap from the stator inside the stator; and a cylindrical rotational shaft for supporting the rotor, and cools the rotor by allowing oil supplied to a vertical through hole of the rotational shaft to flow out through a cooling hole provided in the rotational shaft, in which a recessed portion for storing the oil which includes the cooling hole is provided on an inner peripheral surface of the vertical through hole, and a discharge hole for discharging the oil in the vertical through hole into the casing is provided outside of the recessed portion in the axial direction on an inner peripheral surface of the rotational shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
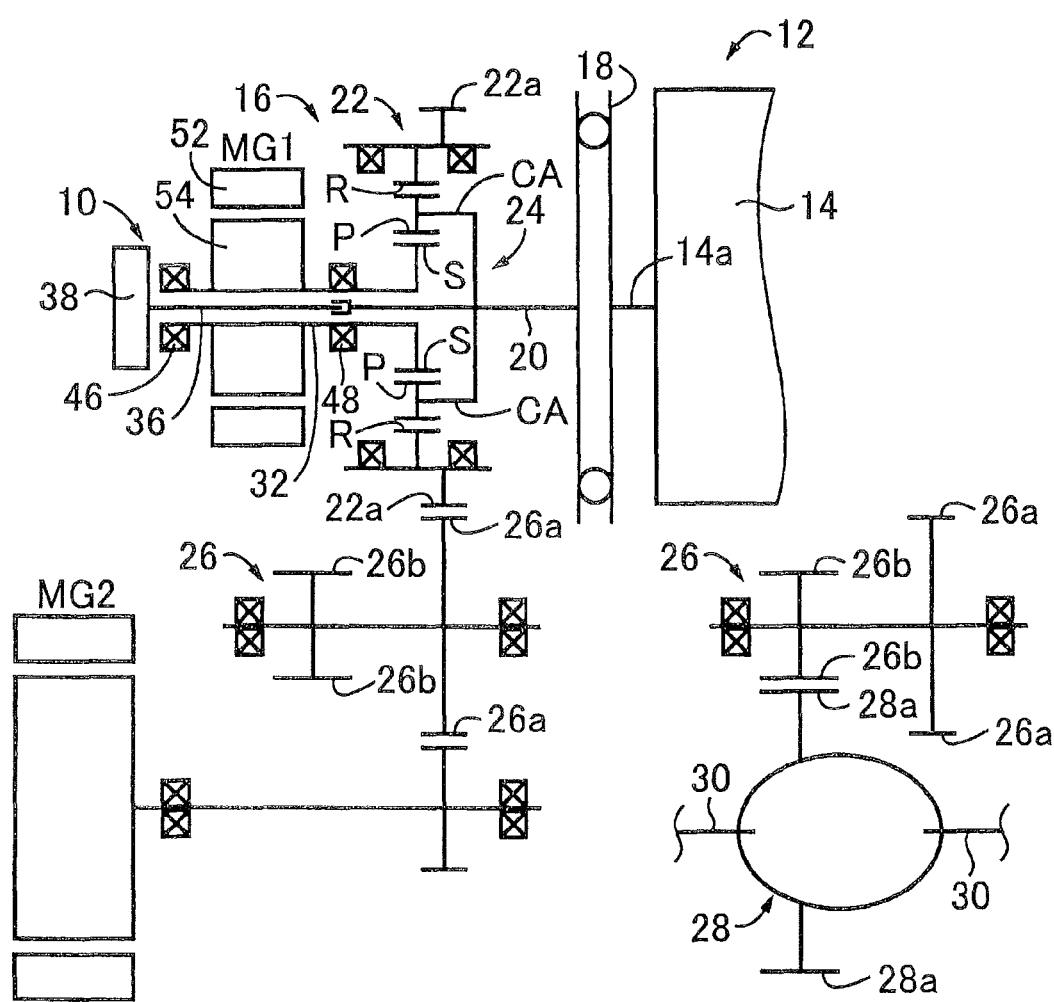
FIG. 1 illustrates a configuration of a hybrid vehicle including a cooling system for a first motor of one embodiment of the present invention.

An embodiment of the present invention will be described hereinafter with reference to drawings. It should be noted that dimension ratios or sizes among portions are not necessarily drawn accurately in the drawings used for descriptions below.

FIG. 1 illustrates a configuration of a hybrid vehicle 12 (hereinafter referred to as vehicle 12) including a cooling system 10 for a first motor MG1 (motor) of one embodiment of the present invention.

In FIG. 1, the vehicle 12 includes an engine 14 as a driving force source for travel and a transaxle 16 which serves as a power transmission device. The transaxle 16 transmits power of the engine 14 to driving wheels which are not shown. Further, the transaxle 16 includes a power distribution mechanism 24, a counter shaft 26, a second motor MG2, and a differential gear 28. The power distribution mechanism 24 distributes power output from the engine 14 to the first motor MG1 and an output gear shaft 22 via a damper 18 and an input shaft 20. Further, the power distribution mechanism 24 is of a planetary gear type. The counter shaft 26 has a counter driven gear 26a. The counter driven gear 26a engages with a counter drive gear 22a of the output gear shaft 22 such that they are incapable of relative rotation. The second motor MG2 is connected with the counter shaft 26 in a manner capable of power transmission thereto. The differential gear 28 has a differential ring gear 28a. The differential ring gear 28a engages with a differential drive gear 26b of the counter shaft 26 such that they are incapable of relative rotation. The power distribution mechanism 24 is configured with a sun gear S, a ring gear R, and a carrier CA. The sun gear S is capable of rotation around an axis C1 of the input shaft 20. The ring gear R is arranged around an outer periphery of the sun gear S. The carrier CA supports a pinion gear P such that the pinion gear P is capable of rotation and revolution. The pinion gear P engages with the sun gear S and the ring gear R. The sun gear S is coupled to an end portion on the engine 14 side of a generally cylindrical rotational shaft 32 of the first motor MG1 by spline-fitting (see FIG. 2) such that they are incapable of relative rotation. The carrier CA is coupled to a flange portion 20a (see FIG. 2) extending in the radial direction from the input shaft 20 such that they are incapable of relative rotation. The ring gear R is unitarily formed on an inner peripheral portion of the output gear shaft 22 in which the counter drive gear 22a is formed.

In the transaxle 16 in such a configuration, the power of the engine 14 is transmitted to the cylindrical output gear shaft 22 and then from the output gear shaft 22 to the counter shaft 26, via the differential gear 28, a pair of drive shafts 30, and so forth in sequence, to the driving wheels. The power of the engine 14 is input via the damper 18 and the input shaft 20. Further, the power of the second motor MG2 is transmitted to the driving wheels via the counter shaft 26, the differential gear 28, the pair of drive shafts 30, and so forth in sequence.

Figure 2:
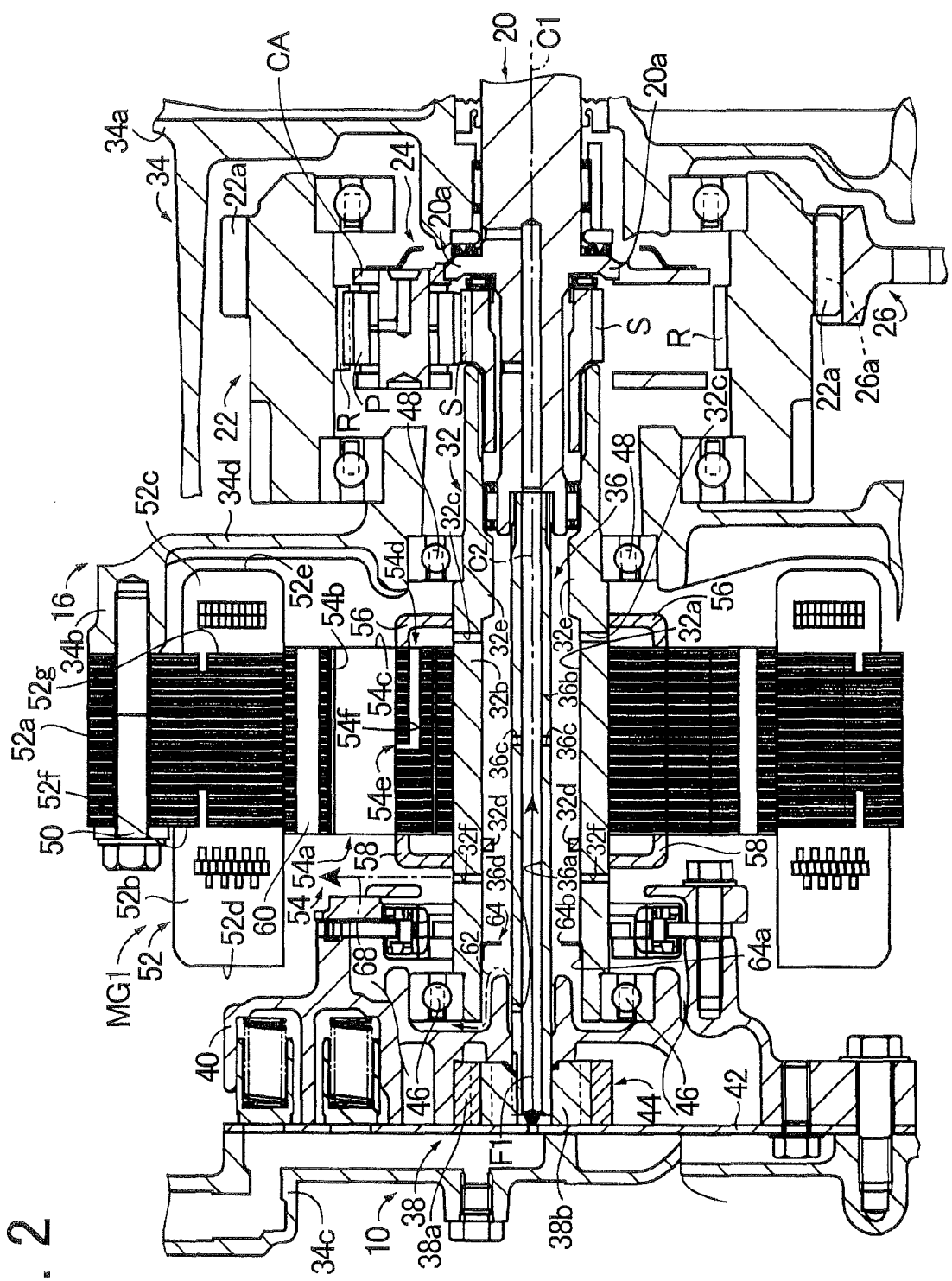
FIG. 2 is a cross-sectional view for illustrating the configuration of the cooling system for the first motor of FIG. 1.

A container-shaped transaxle casing 34 of the transaxle 16 is partially shown in FIG. 2. The transaxle casing 34 is a non-rotating member that is configured with three casing members of a first casing 34a, a cylindrical second casing 34b, and a third casing 34c. The third casing 34c closes an opening on the opposite side to the engine 14 side of the second casing 34b in the axial direction and functions as a side wall. In the transaxle casing 34, end surfaces (mating surfaces) of the casing members in the axial direction are fastened together by bolts, thereby configuring the single transaxle casing 34.

As shown in FIGS. 1 and 2, one end portion of the input shaft 20 is coupled to a crankshaft 14a of the engine 14 via the damper 18, and the input shaft 20 is thus rotationally driven by the engine 14. A cylindrical oil pump driving shaft 36 is coupled to the other end portion of the input shaft 20 by spline-fitting, for example, such that they are incapable of relative rotation. The input shaft 20 is rotationally driven by the engine 14, thereby driving an oil pump 38 via the oil pump driving shaft 36. As shown in FIG. 2, the oil pump 38 is of an internal gear type in which an annular driven gear 38a is engaged with a drive gear 38b. The drive gear 38b has outer peripheral teeth which engage with inner peripheral teeth of the driven gear 38a. In the oil pump 38, an end portion of the oil pump driving shaft 36 on the oil pump 38 side is coupled to the drive gear 38b such that they are incapable of relative rotation.

As shown in FIG. 2, the oil pump 38 includes a pump body 40, a plate 42, and a pump chamber 44. The pump body 40 is fixed to the third casing 34c. The plate 42 is interposed between the pump body 40 and the third casing 34c. Further, the plate 42 is in a flat plate state. The pump chamber 44 is formed between the plate 42 and the pump body 40. In the pump chamber 44, the driven gear 38a and the drive gear 38b are rotatably housed. The pump body 40 is unitarily fixed to the third casing 34c. Further, the pump body 40 is a casing member which functions as a portion of the transaxle casing 34.

As shown in FIG. 2, bearings 46 are interposed between the pump body 40 and an end portion of the rotational shaft 32 on the oil pump 38 side. Bearings 48 are interposed between a flange portion 34d of the second casing 34b and the end portion of the rotational shaft 32 on the engine 14 side. The cylindrical rotational shaft 32 is fixed to the pairs of bearings 46, 48 to be rotatable around an axis C2.

Figure 3:
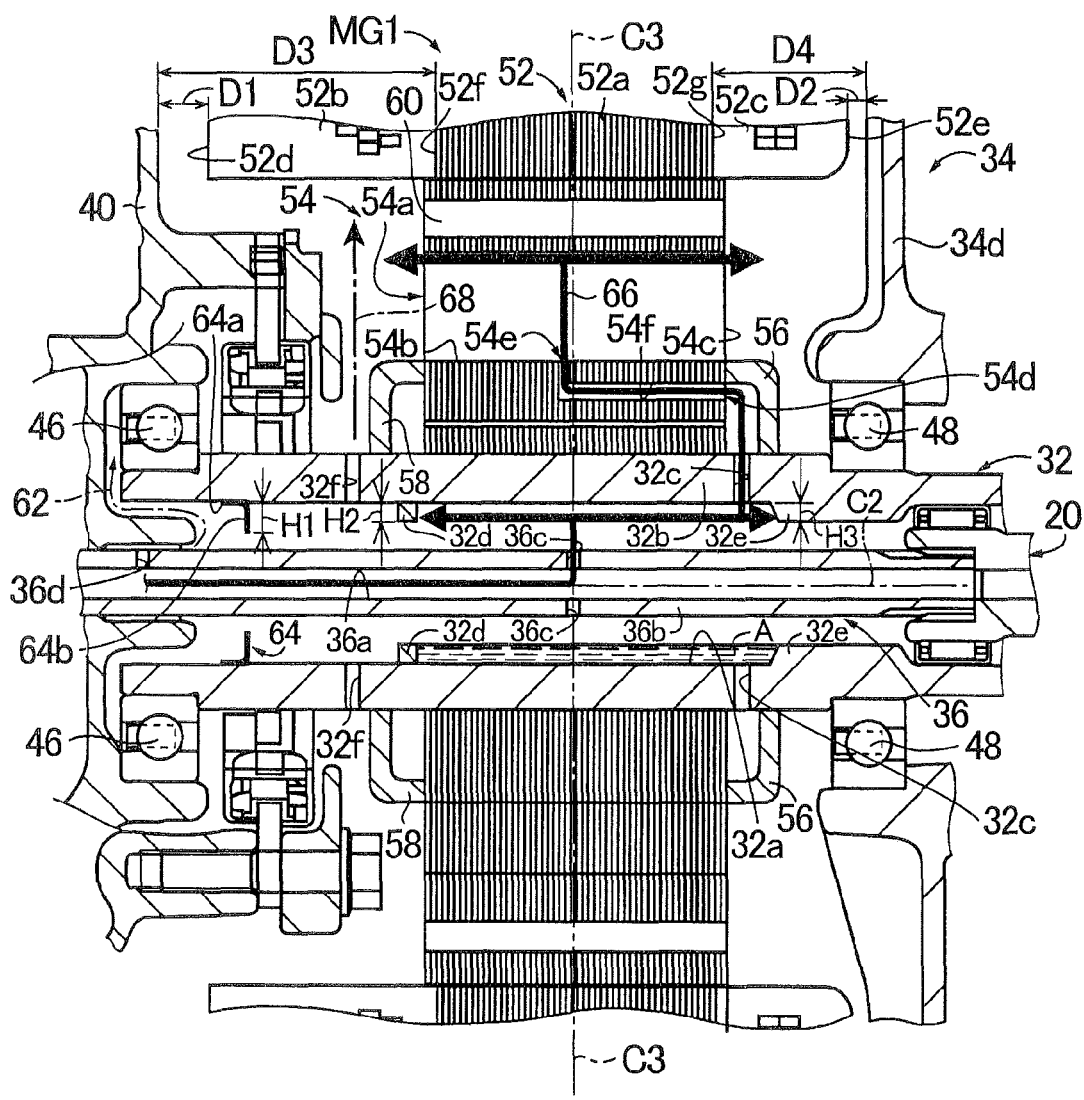
FIG. 3 shows a state where in the cooling system of FIG. 2, a supply amount of oil supplied from an oil pump installed in the cooling system is lower than a discharge amount of oil discharged from cooling holes of a rotor of the first motor.
Figure 4:
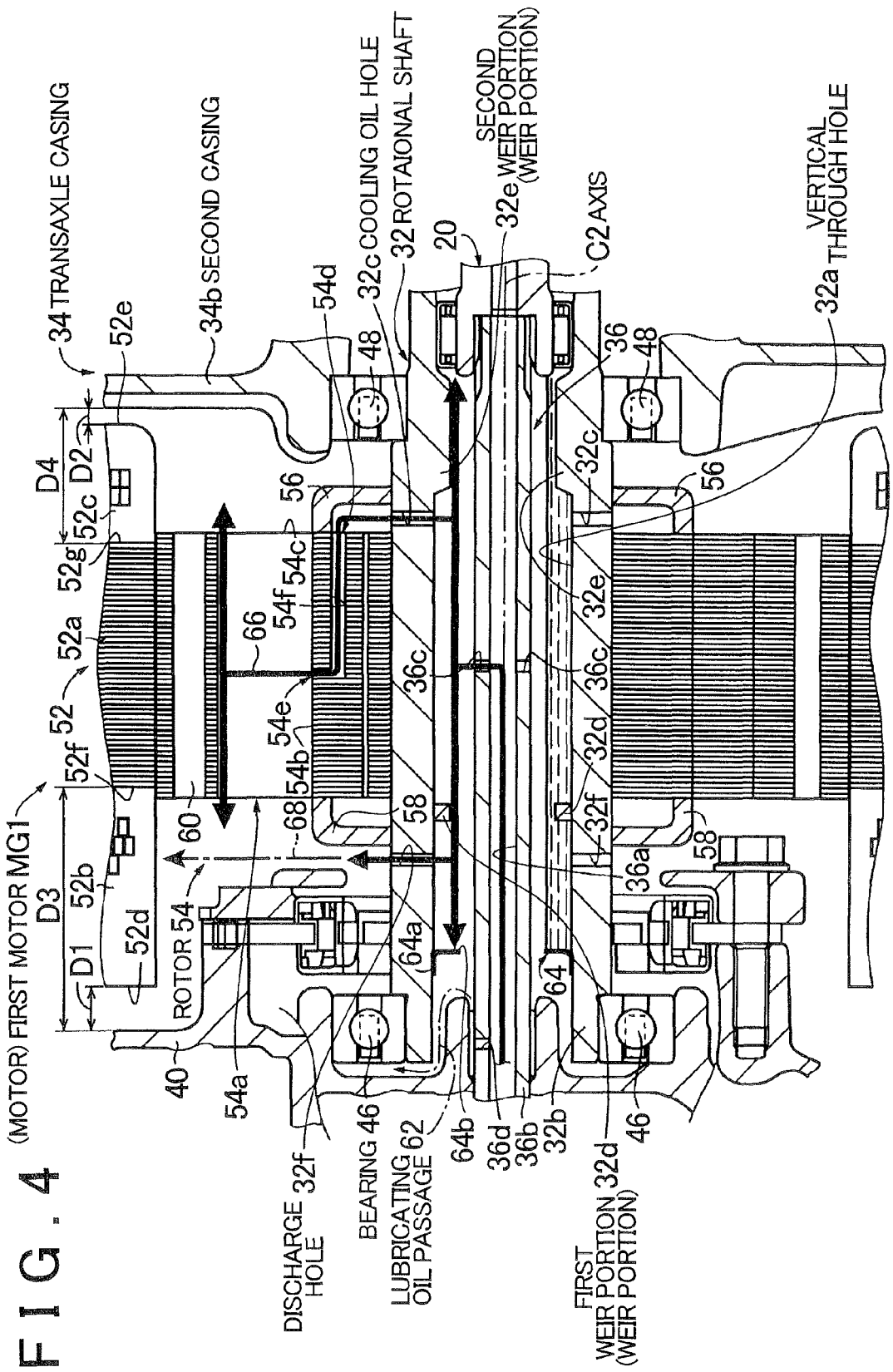
FIG. 4 shows a state where in the cooling system of FIG. 2, the supply amount of oil supplied from the oil pump installed in the cooling system is higher than the discharge amount of oil discharged from the cooling holes of the rotor of the first motor.

As shown in FIGS. 2 to 4, the first motor MG1 includes a cylindrical stator 52, a rotor 54, and the cylindrical rotational shaft 32. The stator 52 is fixed in the second casing 34b by a bolt 50 in the container-shaped transaxle casing 34. The rotor 54 is fixed to the rotational shaft 32 to have a prescribed gap (air gap) from the stator 52 inside the stator 52. In other words, the rotor 54 is arranged to have the prescribed gap from the stator 52 inside the stator 52. The rotational shaft 32 rotatably supports the rotor 54 around the axis C2. The cooling system 10 allows the oil supplied to a through hole 32a to flow out toward an outer periphery of the rotational shaft 32 through a plurality of cooling oil holes 32c and thereby cools the rotor 54 of the first motor MG1 and so forth. The through hole 32a, in a generally column shape, passes through the rotational shaft 32 along its axis C2. Oil is supplied from the oil pump 38. The cooling oil holes 32c are provided to pass through a peripheral wall 32b of the rotational shaft 32.

As shown in FIGS. 2 to 4, an oil pump driving shaft 36 is disposed in the through hole 32a of the rotational shaft 32. The oil pump driving shaft 36 is in a pipe shape and passes in the axis C2 direction in the vertical through hole 32a. The oil pump driving shaft 36 includes a through hole 36a a and a plurality of supply holes 36c (two in FIG. 2). The through hole 36a passes through in the axis C2 direction. The supply holes 36c are provided to pass through the peripheral wall 36b of the oil pump driving shaft 36 such that the through hole 36a communicates with the vertical through hole 32a of the rotational shaft 32. Further, the oil pump 38, when rotationally driven, releases oil into the through hole 36a of the oil pump driving shaft 36. The oil pump 38 is rotationally driven by the engine 14 via the oil pump driving shaft 36. The oil pump 38 discharges oil in arrow F1 direction indicated in FIG. 2. The released oil flows out through the supply holes 36c of the oil pump driving shaft 36 to the outer periphery side and is supplied into the vertical through hole 32a of the rotational shaft 32.

As shown in FIGS. 2 to 4, in order to form an oil storage area A (see FIG. 3), a first weir portion (protrusion portion) 32d and a second weir portion (protrusion portion) 32e are provided in the vertical through hole 32a of the rotational shaft 32. The oil storage area A has a prescribed length which covers the cooling oil holes 32c in the axis C2 direction of the rotational shaft 32. The first weir portion 32d unitarily and annularly protrudes in the radially inward direction of the rotational shaft 32. In other words, the first weir portion (protrusion portion) 32d protrudes unitarily with an inner peripheral surface of the rotational shaft 32 in an annular shape from the inner peripheral surface. The second weir portion 32e is in a stepped shape which unitarily and annularly protrudes in the radially inward direction of the rotational shaft 32 in a generally similar manner to the first weir portion 32d. In other words, the second weir portion 32e protrudes unitarily with the inner peripheral surface of the rotational shaft 32 in an annular shape from the inner peripheral surface. The cooling oil holes 32c are arranged between the first weir portion 32d and the second weir portion 32e in the axis C2 direction of the rotational shaft 32. As shown in FIG. 3, the oil storage area A is an area in a circular pipe shape in the circumferential direction of the rotational shaft 32. Further, the oil storage area A stores the oil which is discharged from the oil pump 38 and flows out through the supply holes 36c of the oil pump driving shaft 36. Moreover, the supply holes 36c of the oil pump driving shaft 36 are arranged in positions facing the oil storage area A in the axial direction of the oil pump driving shaft 36 on an inner periphery side of the oil storage area A.

The rotor 54 of the first motor MG1 includes a rotor core 54a and a pair of end plates 56, 58. The rotor core 54a is formed of a plurality of disk-shaped electromagnetic steel sheets that are stacked in the axis C2 direction on an inner peripheral side of the stator 52. The end plates 56 and 58 adjoin both respective ends of the rotor core 54a, are fixed to the rotational shaft 32 in a state where the rotor core 54a is interposed therebetween, and are in generally disk shapes. Further, in the rotor core 54a, cooling holes 54b and L-shaped oil supply holes 54f are formed in a plurality of positions. The cooling holes 54b pass through the rotor core 54a in a direction parallel to the axis C2 in an outer peripheral portion of the rotor core 54a. The oil supply holes 54f are formed radially inside of the cooling hole 54b. In other words, the oil supply holes 54f are formed on the more inner peripheral side of the rotor core 54a than the cooling holes 54b. Further, the oil supply hole 54f has an inner opening 54d and an outer peripheral opening 54e. The inner opening 54d opens at an axial end surface 54c of the rotor core 54a on the engine 14 side. The outer peripheral opening 54e opens to the inner opening 54d and in the cooling hole 54b. The end plate 56 on the cooling oil hole 32c side of the pair of end plates 56 and 58 functions as an oil guide which guides the oil flowing out through the cooling oil holes 32c to the inner openings 54d of the oil supply holes 54f. Further, in the outer peripheral portion of the rotor core 54a, a plurality of permanent magnets 60 for forming a plurality of magnetic poles on an outer peripheral surface of the rotor core 54a are embedded.

The stator 52 of the first motor MG1 includes a stator core 52a and coil ends 52b and 52c. The stator core 52a is formed of a plurality of disk-shaped electromagnetic steel sheets that are laminated in the axis C2 direction on an outer peripheral side of the rotor 54. The coil ends 52b and 52c protrude from both respective ends of the stator core 52a in the axis C2 direction.

The first motor MG1 attracts (or repels) the permanent magnets 60 embedded in the rotor 54 by a shifting (rotating) magnetic field and thereby rotates the rotor 54. The shifting magnetic field is generated by applying alternating current to the coil ends 52b and 52c of the stator 52. The first motor MG1 is a synchronous motor used in a hybrid vehicle.

As shown in FIGS. 2 to 4, discharge holes 32f are provided in the rotational shaft 32. The discharge holes 32f are provided to pass through the peripheral wall 32b of the rotational shaft 32 in parallel with the cooling oil holes 32c in the axis C2 direction. The discharge holes 32f directly discharge the oil in the vertical through hole 32a which flows over the first weir portion 32d into the transaxle casing 34. The oil flows over the first weir portion 32d in the direction farther than the first weir portion 32d and from a center C3 (see FIG. 3) of the rotor 54 of the first motor MG1 in the axis C2 direction. The direction separating from the center C3 (see FIG. 3) is, in other words, the side separated from the center C3. The oil flowing over the first weir portion 32d is the oil which does not flow out through the cooling oil holes 32c but flows over the first weir portion 32d. The discharge holes 32f are provided in positions for discharging oil on the side on which the distance between the transaxle casing 34 and the stator 52 in the axis C2 direction of the rotational shaft 32 is longer. In other words, the discharge holes 32f are provided in positions for discharging oil on the side at the longer distance between a distance D1 between the pump body 40 as the casing member fixed to the third casing 34c and an end surface 52d of the coil end 52b and a distance D2 between the flange portion 34d of the second casing 34b and an end surface 52e of the coil end 52c (the distance D1 is longer than the distance D2 in this embodiment) or on the side at the longer distance between a distance D3 between the pump body 40 and an end surface 52f of the stator core 52a on the oil pump 38 side and a distance D4 between the flange portion 34d and an end surface 52g of the stator core 52a on the engine 14 side (the distance D3 is longer than the distance D4 in this embodiment). In other words, the discharge holes 32f are provided in positions for discharging oil to the coil end 52b of the stator 52 in the axis C2 direction and on an inner peripheral side of the coil end 52b.

As shown in FIGS. 2 to 4, in the transaxle casing 34 housing the first motor MG1, a discharge passage 68 formed between the pump body 40 and the rotor 54 is provided. The discharge holes 32f are arranged in positions where the distances to the discharge passage 68 and to the first weir portion 32d are relatively short. Accordingly, when oil flows over the weir portion 32d and overflows from the oil storage area A, the overflowing oil flows out through the discharge holes 32f, passes through the discharge passage 68, and is discharged to the coil end 52b.

As shown in FIGS. 2 to 4, a lubricating oil hole 36d is provided in the oil pump driving shaft 36. The lubricating oil hole 36d is provided to pass through the peripheral wall 36b of the end portion of the oil pump driving shaft 36 on the oil pump 38 side. A portion of the oil discharged from the oil pump 38 into the oil pump driving shaft 36 flows out to the lubricating oil hole 36d and lubricates the bearings 46. Between the end portion of the rotational shaft 32 on the oil pump 38 side and the pump body 40, a lubricating oil passage 62 for supplying the oil flowed out through the lubricating oil hole 36d to the bearings 46 is formed.

As shown in FIGS. 2 to 4, a weir member 64 is provided in the vertical through hole 32a of the rotational shaft 32. The weir member (protrusion member) 64 protrudes in the radially inward direction from the end portion of the rotational shaft 32 on the oil pump 38 side to block the oil which has flowed over the first weir portion 32d. In other words, the weir member 64 protrudes from an inner peripheral surface of the end portion of the rotational shaft 32 on the oil pump 38 side. Further, the weir member 64 is unitarily provided with an inner peripheral surface of the vertical through hole 32a. The discharge holes 32f are arranged between the weir member 64 and the first weir portion 32d. The weir member 64 is provided in the end portion of the rotational shaft 32 on the oil pump 38 side which adjoins the lubricating oil passage 62. Accordingly, the oil which has flowed over the first weir portion 32d is prevented from directly entering the lubricating oil passage 62. Further, the weir member 64 includes a cylindrical cylinder portion 64a and a flange portion 64b. The cylinder portion 64a is fixed to the peripheral wall 32b of the rotational shaft 32 in the through hole 32a of the rotational shaft 32. The flange portion 64b unitarily protrudes from an end portion of the cylinder portion 64a on the engine 14 side in the radially inward direction. In other words, the flange portion 64b unitarily protrudes from the end portion of the cylinder portion 64a on the engine 14 side and from the inner peripheral surface of the rotational shaft 32. As shown in FIG. 3, a height H1 of the flange portion 64b of the weir member 64 is greater than a height H2 of the first weir portion 32d in the radial direction of the rotational shaft 32. In a case where the oil supplied from the oil pump 38 rapidly increases, the flange portion 64b can block the oil which has flowed over the first weir portion 32d and can allow the oil to be discharged through the discharge holes 32f. Further, the height H2 of the first weir portion 32d is generally the same as a height H3 of the second weir portion 32e in the radial direction of the rotational shaft 32.

As shown in FIGS. 2 to 4, a cooling oil passage 66 (see FIG. 3) communicates with the lubricating oil passage 62 in the cooling system 10 for the first motor MG1. The cooling oil passage 66 cools the rotor 54 with the oil which has been discharged from the oil pump 38 into the oil pump driving shaft 36 and flowed out through the cooling oil holes 32c. The lubricating oil passage 62 lubricates the bearings 46 by allowing the oil discharged from the oil pump 38 into the oil pump driving shaft 36 to flow out to the lubricating oil hole 36d.

As shown in FIG. 3, according to the cooling system 10 for the first motor MG1 in the above-described configuration, in an HV travel state, when the engine 14 is rotationally driven and the oil pump 38 is thereby driven, the oil discharged into the oil pump driving shaft 36 flows out through the supply holes 36c into the rotational shaft 32 and is stored in the oil storage area A. Then, the oil stored in the oil storage area A flows out through the cooling oil holes 32c by the centrifugal force generated by rotation of the rotor 54 of the first motor MG1. Accordingly, the oil supplied through the oil supply holes 54f in the rotor core 54a to the cooling holes 54b cools the rotor 54. The oil is thereafter discharged through the cooling holes 54b into the transaxle casing 34. The oil supplied to the cooling holes 54b of the rotor core 54a directly cools the permanent magnets 60 embedded in the rotor core 54a and the outer peripheral portion of the rotor core 54a. Further, the oil discharged through the cooling holes 54b to the transaxle casing 34 is supplied to the coil ends 52b and 52c of the stator 52 to cool the stator 52. The HV travel state is a state where the engine 14 and the first motor MG1 are rotationally driven.

Figure 5:
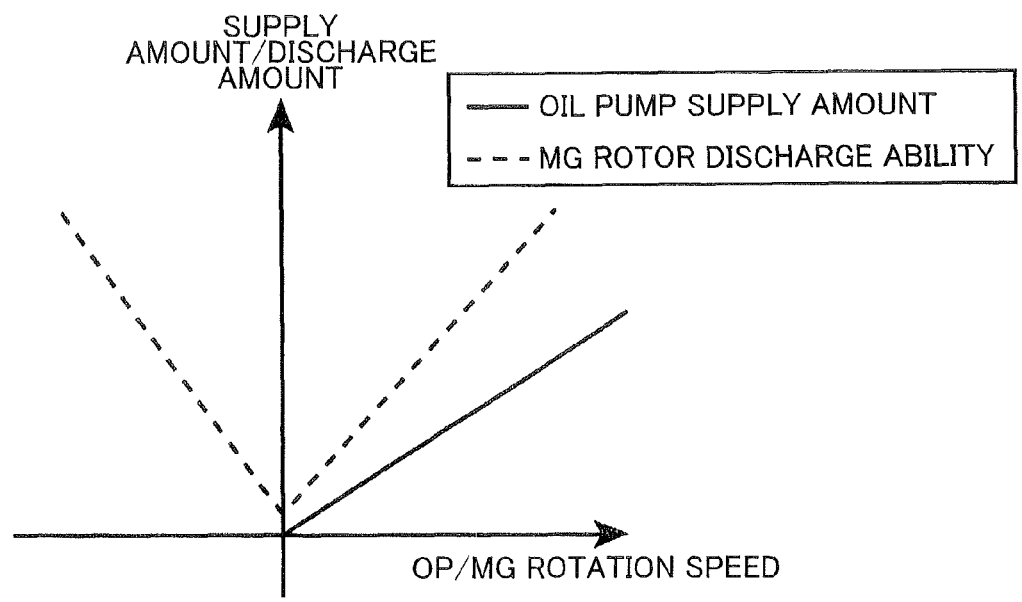
FIG. 5 is a graph representing the relationship between a supply amount of oil discharged from the oil pump (oil pump supply amount) with respect to a rotation speed of the oil pump (OP rotation speed) and a discharge amount discharged from the cooling holes of the rotor of the first motor (MG rotor discharge ability) with respect to a rotation speed of the first motor (MG rotation speed)
Figure 6:
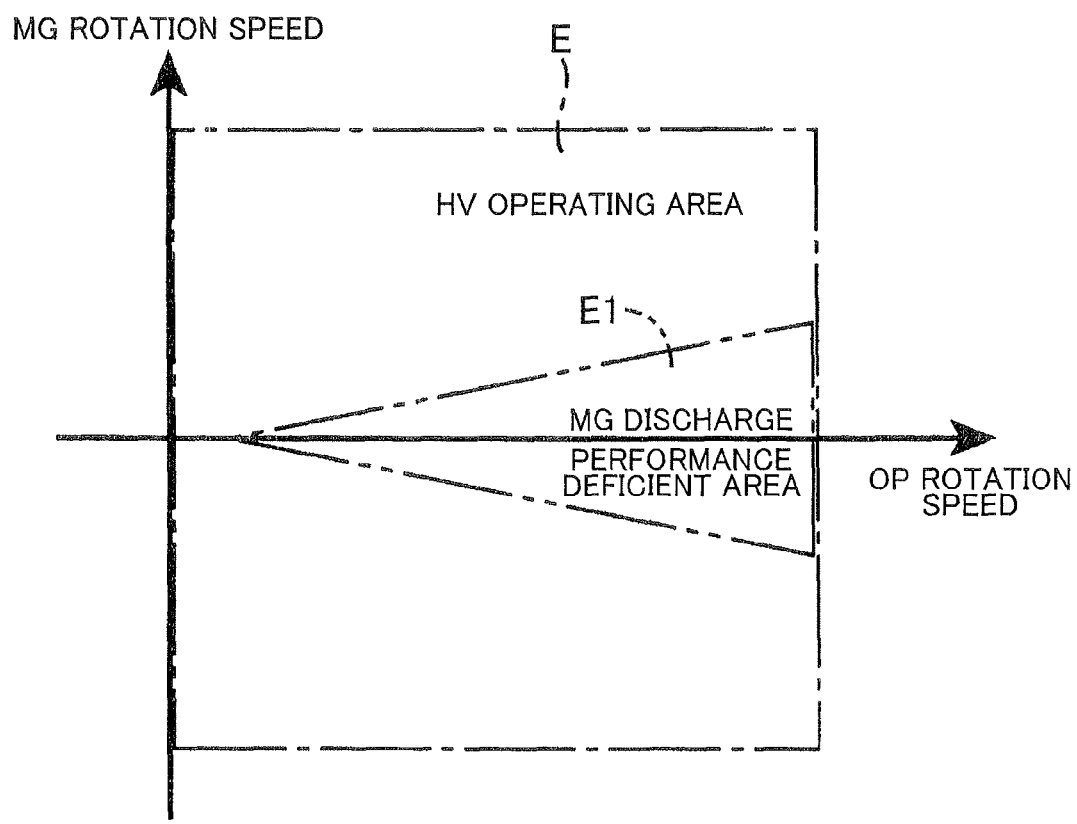
FIG. 6 is a graph representing an MG discharge performance deficient area where in an HV operating area in which an engine and the first motor are rotationally driven, because an engine speed, that is, the rotation speed of the oil pump is relatively high and the rotation speed of the first motor is relatively low, the supply amount of oil supplied from the oil pump thereby exceeds the discharge amount of oil discharged through the cooling holes of the rotor of the first motor.

As shown in FIG. 5, in the cooling system 10 for the first motor MG1, a supply amount of oil (oil pump supply amount) discharged from the oil pump 38 into the oil pump driving shaft 36 increases as a rotation speed of the oil pump 38 (OP rotation speed) increases. In other words, the supply amount of oil discharged from the oil pump 38 into the oil pump driving shaft 36 increases as an engine speed of the engine 14 increases. Further, a discharge amount (MG rotor discharge ability) which is discharged through the cooling holes 54b of the rotor 54 of the first motor MG1 to the transaxle casing 34 increases as a rotation speed (MG rotation speed) of the first motor MG1 increases. As shown in FIG. 6, accordingly, in the cooling system 10 for the first motor MG1, in an MG discharge performance deficient area E1 in an HV operating area E, the supply amount of oil which is supplied from the oil pump 38 via the oil pump driving shaft 36 into the rotational shaft 32 exceeds the discharge amount which is discharged through the cooling holes 54b of the rotor 54 of the first motor MG1 to the transaxle casing 34. As a result, excess oil which is not used for cooling the rotor 54 of the first motor MG1 increases in the rotational shaft 32. The HV operating area E is an area where the engine 14 and the first motor MG1 are rotationally driven. The MG discharge performance deficient area E1 is an area where the engine speed of the engine 14 is relatively high and the rotation speed of the first motor MG1 is relatively low. In other words, the MG discharge performance deficient area E1 is an area where the rotation speed of the oil pump 38 is relatively high and the rotation speed of the first motor MG1 is relatively low.

In the cooling system 10 for the first motor MG1 of this embodiment, even in the MG discharge performance deficient area E1, the excess oil which is not used for cooling the rotor 54 of the first motor MG1 is prevented from being supplied to the bearings 46 via the lubricating oil passage 62. In other words, as shown in FIG. 4, in the cooling system 10 for the first motor MG1, when the oil flowing out through the supply holes 36c by the oil pump 38 flows over the first weir portion 32d and overflows from the oil storage area A, the oil is blocked by the weir member 64 and is directly discharged through the discharge holes 32f into the transaxle casing 34. Accordingly, the excess oil which is not used for cooling the rotor 54 is prevented from being supplied to the bearings 46 via the lubricating oil passage 62. The oil discharged through the discharge holes 32f into the transaxle casing 34 is supplied to the coil end 52b of the stator 52 to cool the stator 52.

As described above, according to the cooling system 10 for the first motor MG1 of this embodiment, in the vertical through hole 32a of the rotational shaft 32, the first weir portion 32d and the second weir portion 32e that protrude in the radially inward direction to form the oil storage area A are provided. The oil storage area A includes the cooling oil holes 32c in the axis C2 direction. Further, the discharge holes 32f are provided in the vertical through hole 32a. The discharge holes 32f are provided to pass through the peripheral wall 32b of the rotational shaft 32 in parallel with the cooling oil holes 32c. The discharge holes 32f directly discharge the oil in the vertical through hole 32a which flows over the first weir portion 32d into the transaxle casing 34. The oil flows over the first weir portion 32d in the direction separating from the first weir portion 32d and from the center C3 of the rotor 54 of the first motor MG1 in the axis C2 direction. Accordingly, the oil supplied into the vertical through hole 32a of the rotational shaft 32 is stored in the oil storage area A by the first weir portion 32d and the second weir portion 32e. The stored oil passes through the cooling oil holes 32c and is supplied into the rotor 54, thereby cooling the rotor 54. Further, when the oil flows over the first weir portion 32d and overflows from the oil storage area A, the overflowing oil is directly discharged into the transaxle casing 34 through the discharge holes 32f. The overflowing oil is the excess oil which is not used for cooling the rotor 54. Accordingly, the excess oil is prevented from being supplied to the bearings 46, rotating bodies, and the like via the lubricating oil passage 62. This prevents the excess oil which is not used for cooling the rotor 54 from decreasing the rotation efficiency of the first motor MG1.

Further, according to the cooling system 10 for the first motor MG1 of this embodiment, the discharge holes 32f are provided in the positions for discharging oil on the side on which the distance between the transaxle casing 34 and the stator 52 is longer in the axis C2 direction. Accordingly, the oil discharged through the discharge holes 32f into the transaxle casing 34 stagnates, thereby making it difficult for the oil to infiltrate into a space between the stator 52 and the rotor 54 in the first motor MG1. This prevents the decrease in the rotation efficiency of the first motor MG1.

Further, according to the cooling system 10 for the first motor MG1 of this embodiment, the discharge holes 32f are provided in the positions for discharging oil in the position in the axis C2 direction in which the oil is discharged to the coil end 52b of the stator 52. Accordingly, the oil discharged from the discharge holes 32f is supplied to the coil end 52b of the stator 52. Therefore, the stator 52 is cooled.

Further, according to the cooling system 10 for the first motor MG1 of this embodiment, in the vertical through hole 32a of the rotational shaft 32, the weir member 64 which protrudes in the radially inward direction to block the oil which has flowed over the first weir portion 32d is provided. In other words, in the vertical through hole 32a of the rotational shaft 32, the weir member 64 which protrudes from the inner peripheral surface to block the oil which has flowed over the first weir portion 32d is provided. The discharge holes 32f are arranged between the weir member 64 and the first weir portion 32d. Therefore, the oil which has flowed over the first weir portion 32d is blocked by the weir member 64 and is discharged through the discharge holes 32f. Accordingly, the excess oil which is not used for cooling the rotor 54 is prevented from being supplied to the bearings 46, the rotating bodies, and the like.

Further, the cooling system 10 for the first motor MG1 of this embodiment includes the oil pump 38 which is rotationally driven by the oil pump driving shaft 36 and discharges oil into the oil pump driving shaft 36. The oil pump driving shaft 36 is a cylinder vertically through the inside of the rotational shaft 32. In the oil pump driving shaft 36 on an inner peripheral side of the oil storage area A, the supply holes 36c to supply oil to the oil storage area A are formed. Accordingly, the oil discharged from the oil pump 38 into the oil pump driving shaft 36 is stored in the oil storage area A in the rotational shaft 32. Therefore, the rotor 54 can be cooled.

Further, according to the cooling system 10 for the first motor MG1 of this embodiment, the rotor core 54a has the cooling holes 54b and the oil supply holes 54f. The cooling holes 54b pass through the rotor core 54a in its outer peripheral portion in the axis C2 direction. The oil supply holes 54f are formed radially inside of the cooling hole 54b. In other words, the oil supply holes 54f are formed on the more inner peripheral side of the rotor core 54a than the cooling holes 54b. Further, the oil supply hole 54f has the inner opening 54d and the outer opening 54e. The inner opening 54d opens at the axial end surface 54c of the rotor core 54a on the engine 14 side. The outer opening 54e opens in the cooling hole 54b. Oil guides 56 are provided in the rotational shaft 32. The oil guide 56 guides the oil flowing out through the cooling oil hole 32c to the inner openings 54d of the oil supply holes 54f. Accordingly, the oil flowing out through the cooling oil holes 32c is guided by the end plate 56 to the oil supply holes 54f of the rotor core 54a and is supplied to the cooling holes 54b. Therefore, the rotor 54 is cooled.

In the foregoing, the embodiment of the present invention has been described with reference to the drawings. However, the present invention is applied to other embodiments.

In this embodiment, the present invention is applied to the cooling system 10 for the first motor MG1 provided in the hybrid vehicle 12, in other words, to the cooling system 10 of a motor for a vehicle. However, the present invention is not limited to the cooling system 10 of a motor for a vehicle. The present invention can be applied to motors for vehicles other than the hybrid vehicle 12 and motors other than the motors for a vehicle.

Further, in this embodiment, the first motor MG1 is a synchronous motor which attracts (or repels) the permanent magnets 60 that are fixed magnetic poles embedded in the rotor 54 to rotate the rotor 54 by the rotating magnetic field generated by applying alternating current to the coil ends 52b, 52c of the stator 52. However, the first motor MG1 may be a direct current motor, an induction motor, or the like, for example.

Further, in this embodiment, in the rotational shaft 32, the first weir portion 32d is provided which unitarily and annularly protrudes in the radially inward direction of the rotational shaft 32. However, the first weir portion 32d may be formed to unitarily and annularly protrude in the radially inward direction of the rotational shaft 32 in a stepped shape as the second weir portion 32e.

Moreover, in this embodiment, the weir member 64 is provided to prevent the oil which has flowed over the first weir portion 32d from directly entering the lubricating oil passage 62. However, for example, if the weir member 64 is not provided, the discharge holes 32f prevent the oil which has flowed over the first weir portion 32d from being supplied to the bearings 46 via the lubricating oil passage 62.

Further, in this embodiment, the height H2 of the first weir portion 32d is generally the same as a height H3 of the second weir portion 32e. However, the height H3 of the second weir portion 32e may be set to a height greater than the height H2 of the first weir portion 32d and that is the same as the height H1 of the flange portion 64b of the weir member 64, for example. Accordingly, even if the oil flows over the first weir portion 32d and overflows from the oil storage area A, the oil which has overflowed from the oil storage area A is prevented from being supplied to the planetary gears of the power distribution mechanism 24 that are the rotating bodies. The planetary gears are supplied with the overflowed oil from a space between the end portion of the rotational shaft 32 on the engine 14 side and an end portion of the input shaft 20 on the oil pump 38 side. This prevents the decrease in the rotation efficiency of the first motor MG1.

Figure 7:
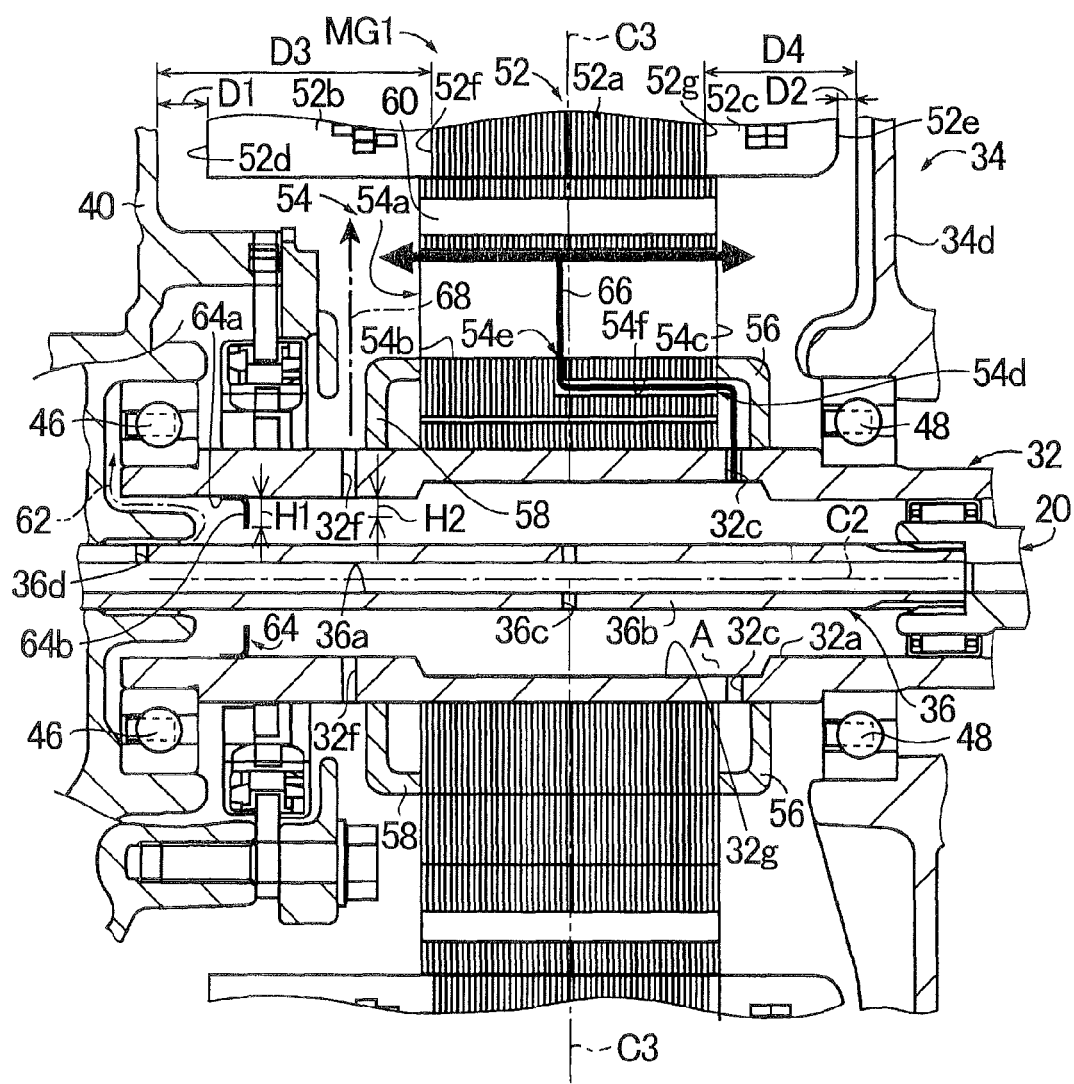
FIG. 7 is a cross-sectional view for illustrating the other configuration of the cooling system for the first motor of FIG. 1.

Further, in this embodiment, the first weir portion 32d and the second weir portion (weir portion) 32e that protrude from the inner peripheral surface of the rotational shaft 32 are provided, thereby forming the oil storage area A. However, as shown in FIG. 7, the oil storage area A may be formed by providing a recessed portion 32g in the inner peripheral surface of the rotational shaft 32. The recessed portion 32g is a recessed portion which is recessed from the inner peripheral surface of the rotational shaft 32 toward an outer peripheral surface of the rotational shaft 32. Further, the recessed portion 32g is annularly recessed in the circumferential direction of the inner peripheral surface of the rotational shaft 32. The discharge holes 32f are provided in the rotational shaft 32. The discharge holes 32f are provided outside of the recessed portion 32g in the axis C2 direction. The oil which has overflowed from the recessed portion 32g is directly discharged through the discharge holes 32f into the transaxle casing 34.

It should be noted that the above-described embodiment is merely one embodiment but the present invention can be practiced in modes with various modifications or improvements on the basis of knowledge of persons having ordinary skill in the art applied thereto.

What is claimed is:

1. A cooling system for a motor, which includes:
a casing including first, second, and third casing members;
a cylindrical stator fixed in the second casing member;
a rotor arranged to have a prescribed gap from the stator inside the stator; and
a cylindrical rotational shaft for supporting the rotor, the cooling system cooling the rotor by allowing oil supplied to a through hole of the rotational shaft to flow out through a first cooling hole provided in the rotational shaft,
wherein in the through hole, a pair of protrusion portions that protrude from an inner peripheral surface of the through hole in a radially inward direction are provided to form a storage area which stores the oil, and the oil stored in the storage area flows out through the first cooling hole,
in the rotational shaft, a discharge hole for discharging the oil in the through hole into the casing is provided on a side farther than the protrusion portion from a center of the motor and in parallel with the first cooling hole,
wherein the stator has a pair of coil ends, which are provided at opposite sides of the stator core in an axial direction of the stator core,
wherein, for discharging oil to one of the pair of coil ends, the discharge hole is located on a side of the stator core, in an axial direction of the stator core, that is the side of the stator core that has a first spaced distance (D1) between a portion of the third casing member and an end surface of the one of the pair of coil ends, and the first spaced distance (D1) is longer than a second spaced distance (D2) between a portion of the second casing member and an end surface of the other of the pair of coil ends.

2. The cooling system for a motor according to claim 1, wherein in the through hole, a protrusion member, which protrudes from the inner peripheral surface, and which blocks the oil flowing over the protrusion portion is provided, and the discharge hole is arranged between the protrusion member and the protrusion portion.

3. The cooling system for a motor according to claim 1, wherein the cooling system includes an oil pump rotationally driven by a cylindrical driving shaft provided in the rotational shaft coaxially to discharge the oil in the driving shaft, and a supply hole for supplying the oil to the storage area is formed in the driving shaft on an inner peripheral side of the storage area.

4. The cooling system for a motor according to claim 1, wherein the rotor has a supply hole formed on a more inner peripheral side of the rotor than the second cooling hole and having an inner opening which opens at an end surface of the rotor and an outer peripheral opening which opens in the second cooling hole, and a guide for guiding the oil flowing out from the storage area through the second cooling hole to the inner opening is provided.

5. A cooling system for a motor, which includes:
a casing including first, second, and third casing members;
a cylindrical stator fixed in the second casing member;
a rotor arranged to have a prescribed gap from the stator inside the stator; and
a cylindrical rotational shaft for supporting the rotor, and cools the rotor by allowing oil supplied to a through hole of the rotational shaft to flow out through a first cooling hole provided in the rotational shaft,
wherein a recessed portion for storing the oil is provided on an inner peripheral surface of the through hole, and
a discharge hole for discharging the oil in the through hole into the casing is provided outside of the recessed portion on an inner peripheral surface of the rotational shaft,
wherein the stator has a pair of coil ends, which are provided at opposite sides of the stator core in an axial direction of the stator core,
wherein, for discharging oil to one of the pair of coil ends, the discharge hole is located on a side of the stator core, in an axial direction of the stator core, that is the side of the stator core that has a first spaced distance (D1) between a portion of the third casing member and an end surface of the one of the pair of coil ends, and the first spaced distance (D1) is longer than a second spaced distance (D2) between a portion of the second casing member and an end surface of the other of the pair of coil ends.

6. A cooling system for a motor, which includes:
a casing including first, second, and third casing members;
a cylindrical stator fixed in the second casing member;
a rotor arranged to have a prescribed gap from the stator inside the stator; and
a cylindrical rotational shaft for supporting the rotor, the cooling system cooling the rotor by allowing oil supplied to a through hole of the rotational shaft to flow out through a first cooling hole provided in the rotational shaft, wherein in the through hole, a pair of protrusion portions that protrude from an inner peripheral surface of the through hole in a radially inward direction are provided to form a storage area which stores the oil, and the oil stored in the storage area flows out through the first cooling hole, in the rotational shaft, a discharge hole for discharging the oil in the through hole into the casing is provided on a side farther than the protrusion portion from a center of the motor and in parallel with the first cooling hole, wherein the stator has opposite end surfaces, which are provided at opposite sides of the stator core in an axial direction of the stator core, wherein, for discharging oil to one of the pair of coil ends, the discharge hole is located on a side of the stator core, in an axial direction of the stator core, that is the side of the stator core that has a spaced distance (D3) between a portion of the third casing member and an end surface of the opposite end surfaces of the stator core, and the spaced distance (D3) is longer than another spaced distance (D4) between a portion of the second casing member and the other end surface of the opposite end surfaces of the stator core.

7. A cooling system for a motor, which includes:
a casing including first, second, and third casing members;
a cylindrical stator fixed in the second casing member;
a rotor arranged to have a prescribed gap from the stator inside the stator; and
a cylindrical rotational shaft for supporting the rotor, and cools the rotor by allowing oil supplied to a through hole of the rotational shaft to flow out through a first cooling hole provided in the rotational shaft, wherein a recessed portion for storing the oil is provided on an inner peripheral surface of the through hole, and a discharge hole for discharging the oil in the through hole into the casing is provided outside of the recessed portion on an inner peripheral surface of the rotational shaft, wherein the stator has opposite end surfaces, which are provided at opposite sides of the stator core in an axial direction of the stator core, wherein, for discharging oil to one of the pair of coil ends, the discharge hole is located on a side of the stator core, in an axial direction of the stator core, that is the side of the stator core that has a spaced distance (D3) between a portion of the third casing member and an end surface of the opposite end surfaces of the stator core, and the spaced distance (D3) is longer than another spaced distance (D4) between a portion of the second casing member and the other end surface of the opposite end surfaces of the stator core.

* * * * *